(12) United States Patent
Kurtz et al.

(10) Patent No.: US 12,482,462 B2
(45) Date of Patent: Nov. 25, 2025

(54) MICROPHONE ARRAY BEAMFORMING CONTROL

(71) Applicant: Comcast Cable Communications, LLC, Philadelphia, PA (US)

(72) Inventors: Scott David Kurtz, Mount Laurel, NJ (US); Michael Sallas, Radnor, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 385 days.

(21) Appl. No.: 17/876,629

(22) Filed: Jul. 29, 2022

(65) Prior Publication Data

US 2023/0215432 A1 Jul. 6, 2023

Related U.S. Application Data

(63) Continuation of application No. 16/776,679, filed on Jan. 30, 2020, now Pat. No. 11,437,033, which is a continuation of application No. 15/962,393, filed on Apr. 25, 2018, now Pat. No. 10,586,538.

(51) Int. Cl.
*G10L 15/22* (2006.01)
*G01S 3/808* (2006.01)
*G10L 21/0216* (2013.01)
*H04R 1/40* (2006.01)
(Continued)

(52) U.S. Cl.
CPC ............ *G10L 15/22* (2013.01); *G01S 3/8083* (2013.01); *G10L 21/0216* (2013.01); *H04R 1/406* (2013.01); *H04R 3/005* (2013.01); *G10L 2015/088* (2013.01); *G10L 2015/223* (2013.01);
(Continued)

(58) Field of Classification Search
CPC ..... G10L 25/00; G10L 25/27; G10L 25/5178; G10L 21/00; G10L 21/02; G10L 21/0224; G10L 21/0364; G10L 15/22
See application file for complete search history.

(56) References Cited

U.S. PATENT DOCUMENTS

| 6,453,292 B2 | 9/2002 | Ramaswamy et al. |
| 6,594,367 B1 | 7/2003 | Marash et al. |
| 7,813,923 B2 | 10/2010 | Acero et al. |

(Continued)

FOREIGN PATENT DOCUMENTS

| CA | 2445180 C | 2/2007 |
| EP | 3078021 A1 | 10/2016 |
| WO | 2015084425 A1 | 6/2015 |

OTHER PUBLICATIONS

Wikipedia Contributors, "Beamforming," Retrieved Dec. 27, 2017, pp. 1-6, https://en.wikipedia.org/w/index.php?title=Beamforming&oldid=813849667.

(Continued)

*Primary Examiner* — Ibrahim Siddo
(74) *Attorney, Agent, or Firm* — Banner & Witcoff, Ltd.

(57) ABSTRACT

Systems, apparatuses, and methods are described for controlling source tracking and delaying beamforming in a microphone array system. A source tracker may continuously determine a direction of an audio source. A source tracker controller may pause the source tracking of the source tracker if a user may continue to speak to the system. The source tracker controller may resume the source tracking of the source tracker if the user may cease to speak to the system, or when one or more pause durations have been reached.

24 Claims, 7 Drawing Sheets

(51) Int. Cl.
*H04R 3/00* (2006.01)
*G10L 15/08* (2006.01)

(52) U.S. Cl.
CPC ... *G10L 2021/02166* (2013.01); *H04R 2430/23* (2013.01)

(56) References Cited

U.S. PATENT DOCUMENTS

| | | |
|---|---|---|
| 7,848,529 B2 | 12/2010 | Zhang et al. |
| 8,842,851 B2 | 9/2014 | Beaucoup |
| 9,264,806 B2 | 2/2016 | Hyun et al. |
| 9,275,637 B1 | 3/2016 | Salvador et al. |
| 9,368,105 B1 | 6/2016 | Freed et al. |
| 9,385,779 B2 | 7/2016 | Sun |
| 9,432,769 B1 | 8/2016 | Sundaram et al. |
| 9,502,021 B1 | 11/2016 | Kleijn |
| 9,596,554 B2 | 3/2017 | Sherman |
| 9,635,186 B2 | 4/2017 | Pandey et al. |
| 9,697,828 B1 | 7/2017 | Prasad et al. |
| 9,805,719 B2 | 10/2017 | Sharifi |
| 2002/0041679 A1 | 4/2002 | Beaucoup |
| 2002/0181723 A1 | 12/2002 | Kataoka |
| 2003/0051532 A1 | 3/2003 | Beaucoup et al. |
| 2003/0053639 A1 | 3/2003 | Beaucoup et al. |
| 2003/0118200 A1 | 6/2003 | Beaucoup et al. |
| 2003/0204397 A1 | 10/2003 | Amiri et al. |
| 2007/0263881 A1 | 11/2007 | Maziar et al. |
| 2014/0028826 A1 | 1/2014 | Lee et al. |
| 2015/0006176 A1 | 1/2015 | Pogue et al. |
| 2017/0155831 A1 | 6/2017 | Jang et al. |
| 2017/0169818 A1 | 6/2017 | VanBlon et al. |
| 2017/0206900 A1 | 7/2017 | Lee et al. |
| 2017/0365271 A1 | 12/2017 | Kupryjanow et al. |
| 2018/0033428 A1* | 2/2018 | Kim ............ G10L 21/0208 |
| 2018/0268808 A1 | 9/2018 | Song |

OTHER PUBLICATIONS

Santos et al., "Intelligent Personal Assistants Based on Internet of Things Approaches," IEEE Systems Journal, May 19, 2016, vol. 12, Issue 2.

Help Wiki Contributors, "Microphone Basics," Retrieved Nov. 26, 2017, pp. 1-3, the Evergreen State College, http://helpwiki.evergreen.edu/wiki/index.php/Microphone_Basics.

Wikipedia Contributors, "Multilateration," Retrieved Dec. 27, 2017, pp. 1-6, https://en.wikipedia.org/w/index.php?title=Multilateration&oldid=806741748.

H. Wang and P. Chu, "Voice source localization for automatic camera pointing system in videoconferencing," 1997 IEEE International Conference on Acoustics, Speech, and Signal Processing, Munich, 1997, pp. 187-190 vol.1.

Sep. 26, 2019—European Extended Search Report—EP 19171209.0.

Jul. 15, 2021—European Office Action—EP 19171209.0.

* cited by examiner

MICROPHONE ARRAY BEAMFORMING CONTROL

CROSS-REFERENCE

This application is a continuation of U.S. application Ser. No. 16/776,679, filed Jan. 30, 2020, which is a continuation of U.S. application Ser. No. 15/962,393 filed Apr. 25, 2018, now U.S. Pat. No. 10,586,538, which are each hereby incorporated by reference in their entirety for any and all non-limiting purposes.

BACKGROUND

Beamforming microphone arrays with steerable directional pick up patterns are widely used to improve signal to noise ratio of an audio signal. A source tracker is often used to track the direction of an audio source, and to provide that information to the microphone array so that the microphone array may target its beamforming at the audio source. However, the source tracker sometimes consumes resources, such as power, in an inefficient manner, or produces inaccurate results. These and other shortcomings are identified and addressed by the disclosure.

SUMMARY

The following summary presents a simplified summary of certain features. The summary is not an extensive overview and is not intended to identify key or critical elements.

Systems, apparatuses, and methods are described for controlling source tracking of a source tracker in a beamforming microphone array system. The source tracking of the source tracker may be paused if a user, who has begun to speak and whose location has already been tracked, is likely to continue to speak to the system. The source tracking of the source tracker may be resumed if the user ceases to speak to the system. The pausing and resuming may help avoid interferences and undesired changes in beamforming targeting if, for example, another person begins speaking before the user completes his or her sentence.

The source tracking of the source tracker may be resumed if one or more pause durations have been reached. The one or more pause durations may help avoid the source tracking of the source tracker being paused indefinitely. The one or more pause durations may be adjusted based on the user's likelihood of movement, the user's surrounding environment, the user's personal activities, and other factors. Information related to the user's surrounding environment and the user's personal activities may be gathered in various ways. A delay may additionally or alternatively be introduced to the beamforming, to allow the source tracker some time to fine tune its source tracking.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
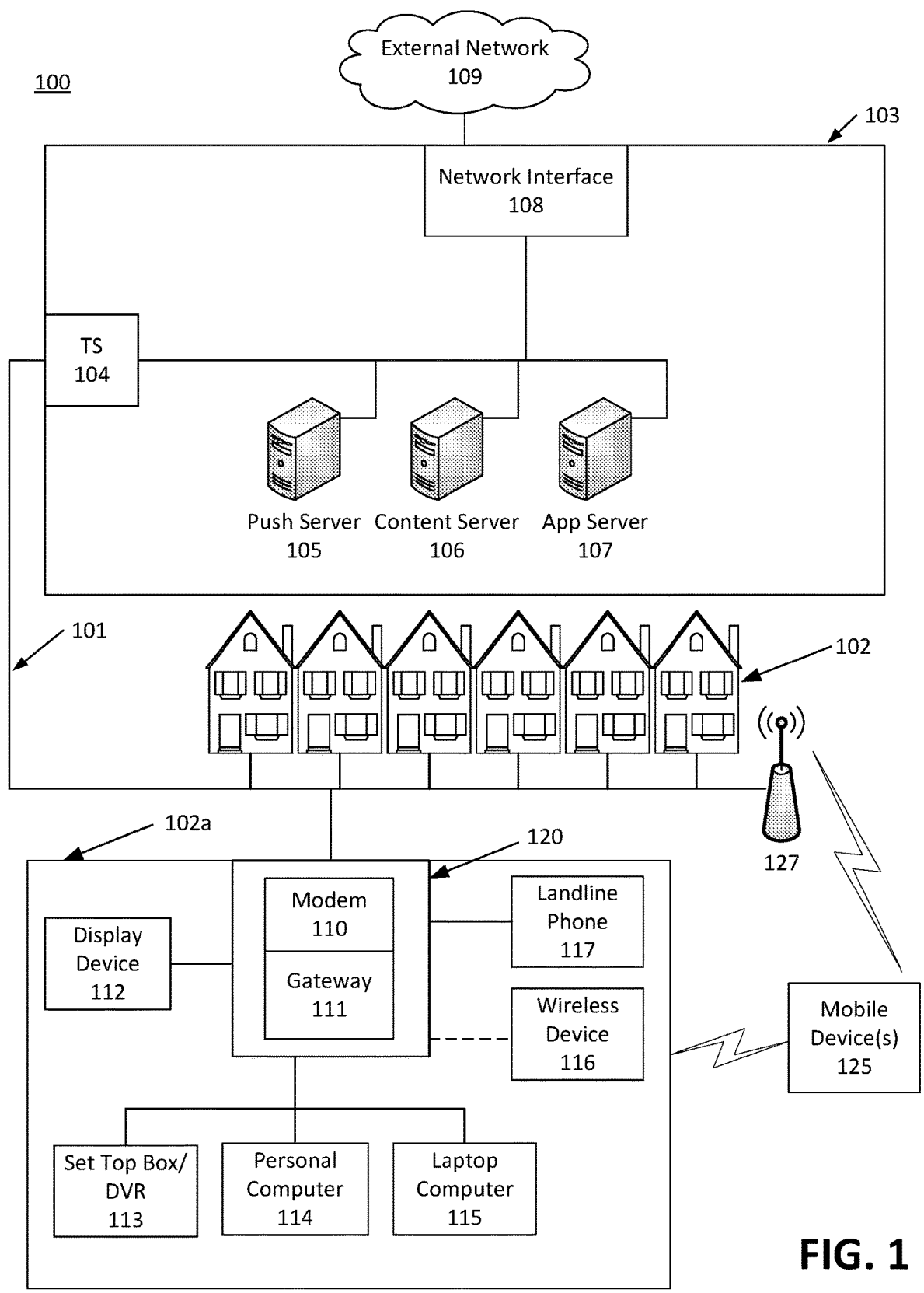
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may be any type of information distribution network, such as satellite, telephone, cellular, wireless, etc. Examples may include an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may transmit downstream information signals and receive upstream information signals via the communication links 101. Each of the premises 102 may have equipment, described below, to receive, send, and/or otherwise process those signals.

Communication links 101 may originate from the local office 103 and may be split to exchange information signals with the various premises 102. The communication links 101 may include components not illustrated, such as splitters, filters, amplifiers, etc., to help convey the signal clearly. The communication links 101 may be coupled to an access point 127 (e.g., a base station of a cellular network, a Wi-Fi access point, etc.) configured to provide wireless communication channels to communicate with one or more mobile devices 125. The mobile devices 125 may include cellular mobile devices, and the wireless communication channels may be Wi-Fi IEEE 802.11 channels, cellular channels (e.g., LTE), and/or satellite channels.

The local office 103 may include an interface 104, such as a termination system (TS). The interface 104 may be a cable modem termination system (CMTS), which may be a computing device configured to manage communications between devices on the network of the communication links 101 and backend devices such as servers 105-107. The interface 104 may be configured to place data on one or more downstream frequencies to be received by modems at the various premises 102, and to receive upstream communications from those modems on one or more upstream frequencies.

The local office 103 may also include one or more network interfaces 108 which may permit the local office 103 to communicate with various other external networks 109. The external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the external networks. For example, the local office 103 may also or alternatively communicate with a cellular telephone network and its corresponding mobile devices 125 (e.g., cell phones, smartphone, tablets with cellular radios, laptops communicatively coupled to cellular radios, etc.) via the interface 108.

The push notification server 105 may generate push notifications to deliver data and/or commands to the various premises 102 in the network (or more specifically, to the devices in the premises 102 that are configured to detect such notifications). The content server 106 may be one or more computing devices that are configured to provide content to devices at premises. This content may be, for example, video on demand movies, television programs, songs, text listings, web pages, articles, news, images, files, etc. The content server 106 (or, alternatively, an authentication server) may include software to validate user identities and entitlements, to locate and retrieve requested content and to initiate delivery (e.g., streaming) of the content to the requesting user(s) and/or device(s). The application server 107 may be a computing device configured to offer any desired service, and may execute various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. The local office 103 may include additional servers, including additional push, content, and/or application servers, and/or other types of servers. Although shown separately, the push server 105, the content server 106, the application server 107, and/or other server(s) may be combined. The servers 105, 106, 107, and/or other servers, may be computing devices and may include memory storing data and also storing computer executable instructions that, when executed by one or more processors, cause the server(s) to perform steps described herein.

An example premise 102a may include an interface 120. The interface 120 may include any communication circuitry used to communicate via one or more of the links 101. The interface 120 may include a modem 110, which may include transmitters and receivers used to communicate via the links 101 with the local office 103. The modem 110 may be, for example, a coaxial cable modem (for coaxial cable lines of the communication links 101), a fiber interface node (for fiber optic lines of the communication links 101), twisted-pair telephone modem, cellular telephone transceiver, satellite transceiver, local Wi-Fi router or access point, or any other desired modem device. One modem is shown in FIG. 1, but a plurality of modems operating in parallel may be implemented within the interface 120. The interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway interface device 111 may comprise a set-top box (STB), digital video recorder (DVR), a digital transport adapter (DTA), computer server, and/or any other desired computing device. The gateway interface device 111 may also include local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

One or more of the devices at a premise 102a may be configured to provide wireless communications channels (e.g., IEEE 802.11 channels) to communicate with a mobile device 125. A modem 110 (e.g., access point) or a wireless device 116 (e.g., router, tablet, laptop, etc.) may wirelessly communicate with one or more mobile devices 125, which may be on- or off-premises.

Mobile devices 125 may communicate with a local office 103. Mobile devices 125 may be cell phones, smartphones, tablets (e.g., with cellular transceivers), laptops (e.g., communicatively coupled to cellular transceivers), wearable devices (e.g., smart watches, electronic eye-glasses, etc.), or any other mobile computing devices. Mobile devices 125 may store, output, and/or otherwise use assets. An asset may be a video, a game, one or more images, software, audio, text, webpage(s), and/or other content. Mobile devices 125 may include Wi-Fi transceivers, cellular transceivers, satellite transceivers, and/or global positioning system (GPS) components.

Figure 2:
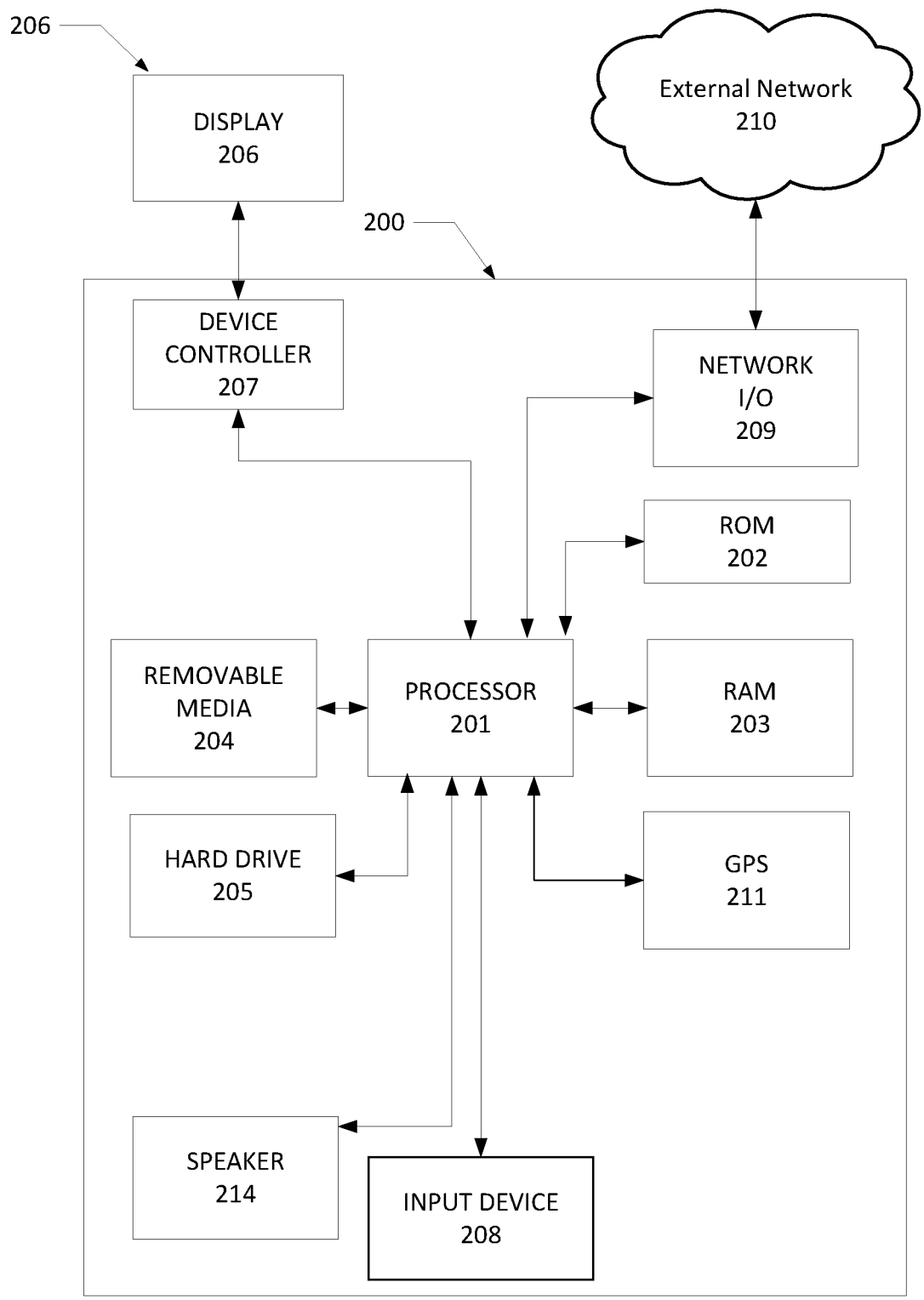
FIG. 2 shows hardware elements of a computing device.

FIG. 2 shows hardware elements of a computing device that may be used to implement any of the computing devices discussed herein. The computing device 200 may include one or more processors 201, which may execute instructions of a computer program to perform any of the functions described herein. The instructions may be stored in a read-only memory (ROM) 202, random access memory (RAM) 203, removable media 204 (e.g., a Universal Serial Bus (USB) drive, a compact disk (CD), a digital versatile disk (DVD)), and/or in any other type of computer-readable medium or memory. Instructions may also be stored in an attached (or internal) hard drive 205 or other types of storage media. The computing device 200 may include one or more output devices, such as a display 206 (e.g., an external television or other display device), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. The network input/output circuit 209 may include a modem (e.g., a cable modem), and the external network 210 may include the communication links 101 discussed above, the external network 109, an in-home network, a network provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
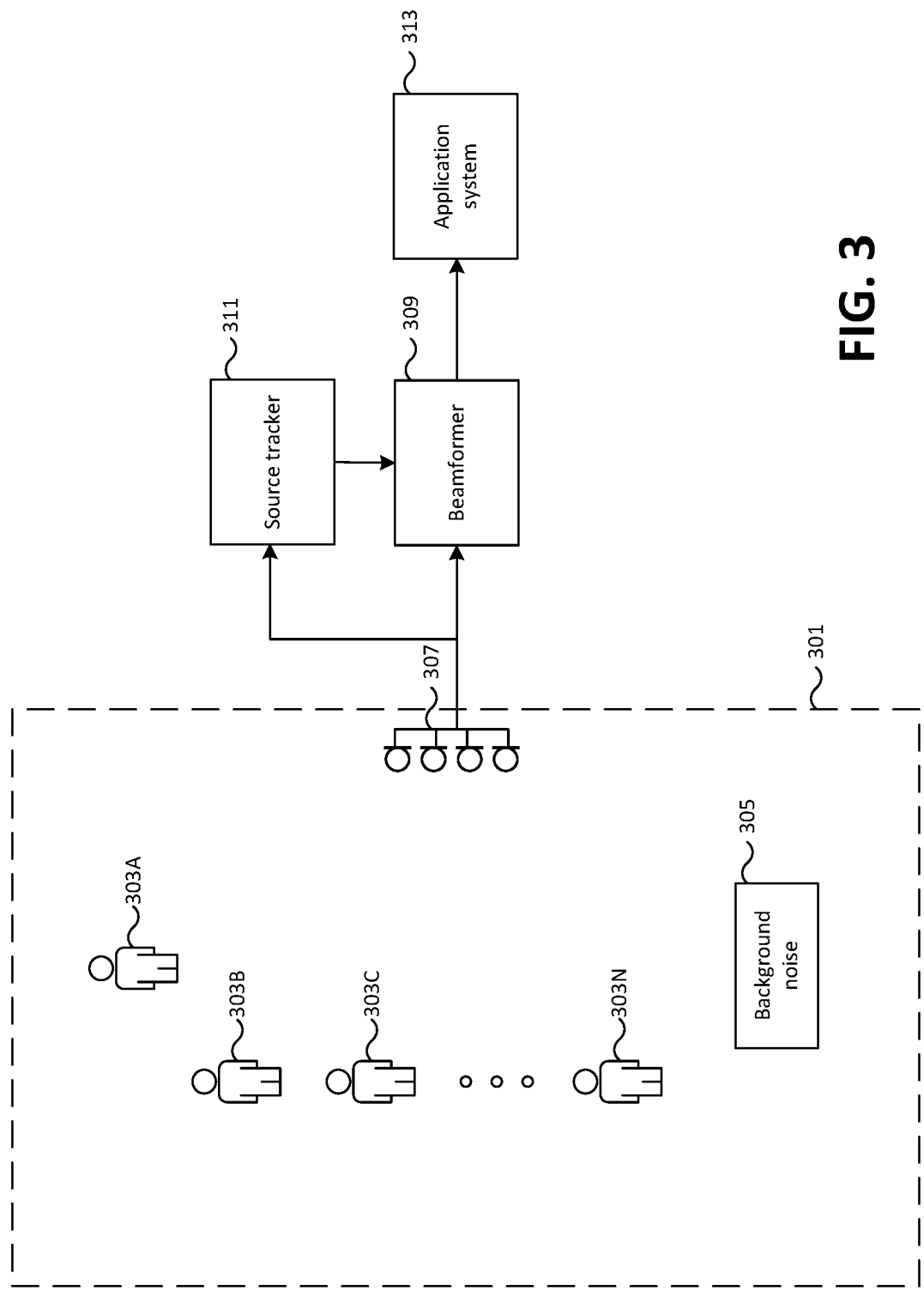
FIG. 3 is a schematic diagram showing an example system for beamforming audio signals in the direction of an audio source.

FIG. 3 is a schematic diagram showing an example system for beamforming audio signals in the direction of an audio source. The example system may include an environment 301, one or more users 303A-N, a source of background noise 305, a microphone array 307, a beamformer 309, a source tracker 311, and an application system 313. The beamformer 309, the source tracker 311, and the application system 313 may be associated with processes executed on the servers 105-107, the devices 110-117, 125, the computing device 200, or any other computers or devices. For example, the beamformer 309 and the source tracker 311 may be implemented in customer premises equipment, near the microphone array 307. Even though the beamformer 309, the source tracker 311, and the application system 313 are shown to be outside the environment 301, these components (or the device that implements these components) may be inside the environment 301.

The environment 301 may be a house, a building, an office, a conference room, a public forum (e.g., a sidewalk, a square, etc.), or other types of places. The background noise 305 may be environmental noises such as waves, traffic noise, alarms, people talking, bioacoustic noise from animals or birds, or mechanical noise from devices such as refrigerators, air conditioning, power supplies, motors, etc.

The one or more users 303A-N may speak with each other. Their conversation may be organized (e.g., each user in turn speaks at each time), or their conversation may be disorganized (e.g., each user tries to speak over the other users). Additionally or alternatively, the user 303A may be presenting a topic and the other users 303B-303N may be listening to the presentation. Additionally or alternatively, there may be only one user in the environment 301.

The microphone array 307 may include a plurality of microphones. Each of the plurality of microphones may receive utterances of the users 303A-N and the background noise 305. The output of the each of the plurality of microphones may be an audio signal corresponding to the combination of the utterances of the users 303A-N and the background noise 305. The audio signal may be in analog or digital form. The audio signals from the plurality of microphones of the microphone array 307 may be input into the beamformer 309 and the source tracker 311.

The beamformer 309 may apply beamforming to the audio signals and output a beamformed audio signal that enhances the sound arrived from a specific direction. The beamformer 309 may process the audio signals to cause directional reception from an audio source. The audio signals (in digital or analog forms) may be added up, with appropriate scale-factors or phase-shifts (e.g., determined based on the direction to be focused on), to get a composite signal (e.g., the beamformed signal). For example, the beamformer 309 may filter the audio signals with a linear filter, and sum the filtered audio signals. The filtered audio signals may add coherently for a signal originating from one direction, and cancel for interfering signals originating from other directions.

The source tracker 311 may determine the direction of the audio source, and inform the beamformer 309 of the direction in which the beamformer 309 is to focus. The source tracker 311 may be implemented as a separate module feeding the beamformer 309 with the direction of the audio source, or as part of an adaptive beamforming algorithm.

The beamformed audio signal that the beamformer 309 outputs may be input into the application system 313 and used by the application system 313 for various purposes. For example, the application system 313 may be an Intelligent Personal Assistant system or other systems configured to recognize and execute a user's voice commands. Additionally or alternatively, the application system 313 may be an Automatic Speech Recognition system configured to generate a transcription of a user's utterance. Additionally or alternatively, the application system 313 may be communication application system, such as a telephone or messaging system, and the beamformed audio signal may be transmitted to another location (e.g., a telephone loudspeaker in the other location).

Figure 4:
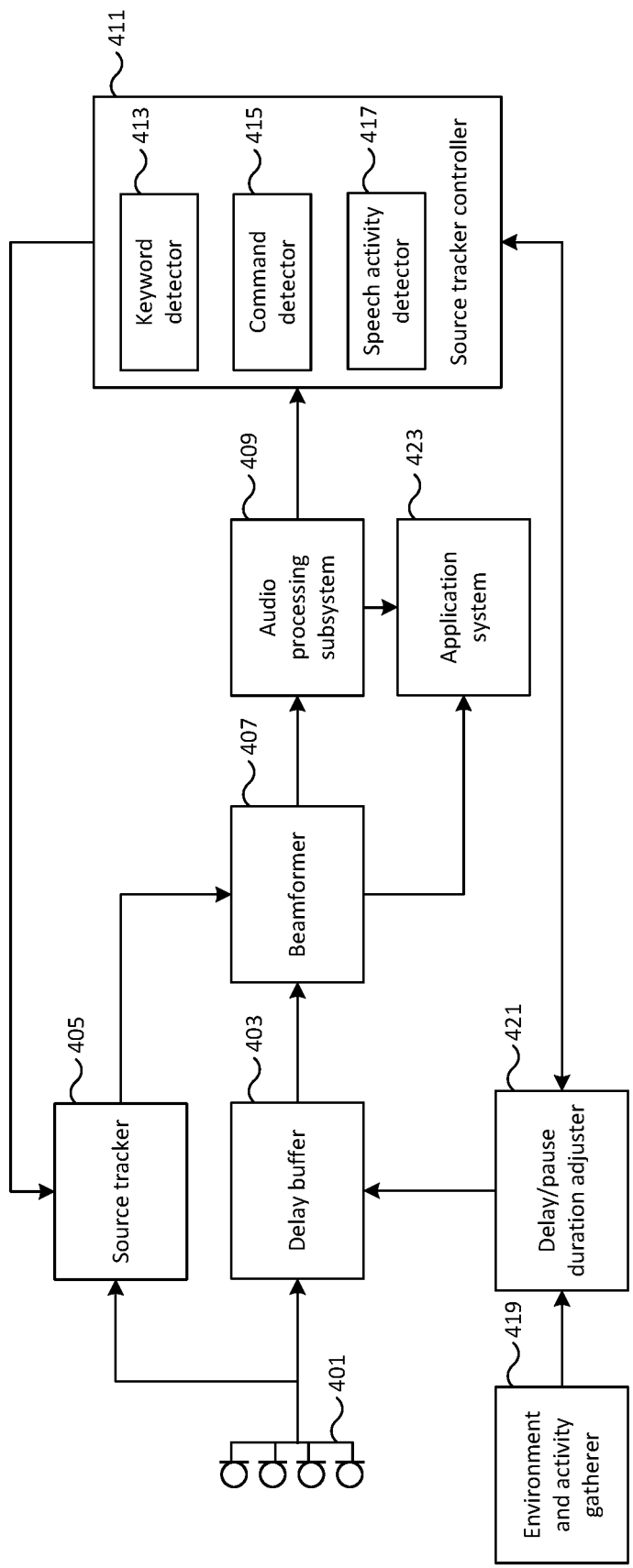
FIG. 4 is a schematic diagram showing an example system for controlling beamforming.

FIG. 4 is a schematic diagram showing an example system for controlling beamforming. The example system may include a microphone array 401, a delay buffer 403, a source tracker 405, a beamformer 407, an audio processing subsystem 409, a source tracker controller 411 (including a keyword detector 413, a command detector 415, and a speech activity detector 417), an environment and activity gatherer 419, a delay/pause duration adjuster 421, and an application system 423. The example system may comprise processes executed on the servers 105-107, the devices 110-117, 125, the computing device 200, or any other computers or devices.

The microphone array 401 may include a plurality of microphones. Each of plurality of microphones may detect sound in the environment (e.g., the environment 301) and generate an audio signal, which may be sent to the delay buffer 403 and the source tracker 405 in parallel.

Based on the audio signals from the microphone array 401, the source tracker 405 may determine the direction of the audio source. The source tracker 405 may determine the direction of the audio source in various ways. For example, the source tracker 405 may use the time difference of arrival (TDOA) method to determine the direction of the audio source. Additionally or alternatively, the source tracker 405 may use triangulation to determine the direction of the audio source. Additionally or alternatively, the source tracker 405 may include one or more particle velocity probe configured to measure the acoustic particle velocity directly. The particle velocity is a vector and contains directional information. The source tracker 405 may use other methods to determine the direction of the audio source.

The determined direction may be sent to the beamformer 407, which may use the determined direction as a parameter to conduct beamforming on the audio signals, and to amplify and/or isolate the sound originating from a particular area in the environment 301. The beamformed audio signal that the beamformer 407 outputs may be input into the application system 423 and used by the application system 423 for various purposes. For example, the application system 423 may be an Intelligent Personal Assistant system or other systems configured to recognize and execute a user's voice commands. As discussed in connection with FIG. 3, the application system 423 may be other types of systems.

There may be an inherent delay (a tracking acquisition period) between the onset of a sound and the time that the source tracker 405 correctly identifies the direction of the audio source. If the direction of the audio source is used to focus the microphone array 401 in the direction of the audio source (using beamforming) for the purpose of improving signal to noise (SNR) ratio, the degree of SNR ratio improvement will not reach its maximum value until the direction of the audio source has been correctly estimated. As a result, the quality of the beamformed audio signal during the tracking acquisition period (e.g., before the source tracker 405 has fully determined the direction of the audio source) may be lower than the quality of the beamformed audio signal that follows the tracking acquisition period. The delay buffer 403 may be used to improve the quality of the beamformed audio signal during the tracking acquisition period by delaying beamforming on the audio signals until the source tracker 405 has fully determined the direction of the audio source.

The delay buffer 403 may delay sending the audio signals from the microphone array 401 to the beamformer 407. The delay buffer 403 may introduce a same delay to each of the audio signals before the audio signals are sent to the beamformer 407. The delay buffer 403 may include a first in first out buffer, and may store the audio signals in the first in first out buffer.

With the delay buffer 403, the beamformer 407 may delay beamforming on the audio signals until the source tracker 405 has acquired the direction of the audio source (i.e., until after the tracking acquisition period). Then the beamformer 407 may read the audio signals stored in the delay buffer 403, and use the determined direction as a parameter to process the audio signals, outputting a beamformed audio signal that enhances the sound received from the determined direction. With the delay buffer 403, the entire lengths of the audio signals can be beamformed based on the correct direction of the audio source. A method for delaying beamforming is further discussed in connection with FIGS. 5A-C.

Additionally or alternatively, voice recognition functions may be delayed until beamforming is completed. For example, voice recognition processing of audio signals may be delayed, until the beamformer 407 generates, based on the direction of the audio source determined by the source tracker 405, the beamformed audio signal. The voice recognition function in the application system 423 may be delayed (e.g., until the voice recognition function receives the beamformed audio signal that is output by the beamformer 407).

The source tracker 405 may continuously receive the audio signals from the microphone array 401. Based on the audio signals, the source tracker 405 may continuously determine the direction of the audio source. It might be advantageous to pause the continuous source tracking in certain situations, e.g., where one user intends to continue to speak to the application system 423 and other users or background noise may interfere with the source tracker 405 to cause incorrect determination of the direction of the audio source. The events triggering the pausing may depend on the application system 423, as when the user speaks to a different application system 423 the user may have different behavior that indicates his or her intention to continue to speak to the application system 423.

For example, the application system 423 may be an Intelligent Personal Assistant system or other systems configured to recognize and execute a user's voice commands. Audio sources other than the user speaking a keyword or command phrase (i.e., interferers) may cause the source tracker 405 to point in an incorrect direction or bounce between the correct direction and the incorrect directions. For example, one user may start to utter a command phrase "change to channel five", but before the user finishes saying that command phrase (e.g., after merely saying "change"), another user may start to say something as well. To avoid suddenly shifting the direction of the beamforming before the first user has completed his or her command phrase, the example system may pause the source tracking after hearing the word "change," if the example system knows that is the beginning keyword of a command phrase.

The source tracker controller 411 may be used to avoid interferences from other audio sources if the user has spoken a word, a keyword, or a command phrase and is expected to continue speaking. As discussed below, the source tracker controller 411 may pause the source tracking of the source tracker 405 if the source tracker controller 411 determines that the user has started speaking to the application system 423, and is likely to continue to speak to the application system 423.

The beamformed audio signal from the beamformer 407 may be input into and processed by the audio processing subsystem 409. For example, the audio processing subsystem 409 may identify acoustic features, e.g., phonetics, of the beamformed audio signal. Additionally or alternatively, the audio processing subsystem 409 may perform Automatic Speech Recognition, and produce a transcription of the beamformed audio signal. Additionally or alternatively, the audio processing subsystem 409 may simply retransmit the beamformed audio signal to the source tracker controller 411 without additionally processing the beamformed audio signal. Additionally or alternatively, the Automatic Speech Recognition (e.g., voice recognition functions) in the audio processing subsystem 409 may be delayed until the beamforming is completed.

The audio processing subsystem 409 may provide its processed audio signal to the application system 423. And the application system 423 may use the processed audio signal for its various purposes. The audio processing subsystem 409 may provide its processed audio signal to the source tracker controller 411. Additionally or alternatively, the audio signals from the microphone array 401 may be input into the source tracker controller 411, and, in addition to or as an alternative of the processed audio signal from the audio processing subsystem 409, may be used by the source tracker controller 411 to make various determinations as described below. The source tracker controller 411 may include the keyword detector 413, the command detector 415, and the speech activity detector 417.

The keyword detector 413 may determine whether the processed audio signal indicates a keyword or a portion of a keyword. For example, the keyword detector 413 may compare the acoustic features of the beamformed audio signal with the acoustic features of an audio signal corresponding to the keyword. Additionally or alternatively, the keyword detector 413 may compare the transcription of the beamformed audio signal with the text of the keyword to see if they match. Additionally or alternatively, the keyword detector 413 may compare the waveform data of the beamformed audio signal with the waveform data of an audio signal corresponding to the keyword (i.e., comparing the audio signal patterns). If the difference in the comparison is less than a threshold, the keyword detector 413 may determine that the keyword is found in the beamformed audio signal. Additionally or alternatively, the keyword detector 413 may make the determination by using a combination of the above methods. Other methods may also be used.

The command detector 415 may determine whether a voice command is received from the user. The command detector 415 may include a Natural Language Processing component, which, based on the processed audio signal (e.g., the transcription of the beamformed audio signal), may convert the natural language (e.g., command phrases) in the transcription to machine executable voice commands.

The speech activity detector 417 may determine whether human speech is present in the processed audio signal. This determination may be made in various ways. For example, the determination may be made based on the voice activity detection used in G.729 codec. Additionally or alternatively, energy based techniques may be used. The energy of all the speech frames may be computed for a given speech utterance. An empirical threshold may be selected from the frame energies. The threshold may be determined from the maximum energy of the speech frames. Other methods may also be used to make this determination.

Based on the determinations of the keyword detector 413, the command detector 415, and the speech activity detector 417, the source tracker controller 411 may pause the source tracking of the source tracker 405 if the user indicates that the user is likely to continue to speak to the application system 423, and resume the source tracking of the source tracker 405 if the user indicates that the user is not likely to continue to speak to the application system 423.

For example, in cases where the application system 423 is an Intelligent Personal Assistant system, if the user speaks a portion of a keyword, a keyword, or a portion of a command phrase, the user may indicate to continue to speak to the application system 423 (e.g., to complete the keyword, to start speaking the command phrase, or to complete the command phrase). On the other hand, if the user speaks a wrong keyword, completes a command phrase, or fails to say anything within a pause duration after uttering a keyword, the user may indicate not to continue to speak to the application system 423. A method for pausing and resuming source tracking is further discussed in connection with FIGS. 5A-C.

The environment and activity gatherer 419 may obtain information related to the environment 301 and the user's personal activities. Based on the information, the delay/pause duration adjuster 421 may additionally or alternatively determine how much delay, if any, the delay buffer 403 may apply to the beamforming, and/or how long, if at all, the source tracker 405 may be paused.

The environment and activity gatherer 419 may obtain the information in various ways. For example, the information may be entered by the user through a user interface. The user interface may prompt the user to choose what the environment 301 is (e.g., a house, an office, or a public forum, etc.), how many users are in the environment 301, who are the users (e.g., parents, children, colleagues, strangers, etc.), and/or what activities the users are likely to conduct using the application system 423 (e.g. watching TV, playing video games, working, turning on or off the lights, shopping online, searching for information online, etc.).

Additionally or alternatively, the information may be obtained by sensors. For example, vision sensors may determine what the environment 301 is and how many users are in the environment 301. Analyzing the output of the vision sensors (e.g., video recordings of the environment 301) may produce the personal activities of the users, and/or the location of the user within the environment 301 (e.g., in the kitchen, in the living room, at the desk, in front of a video game console, on the couch, etc., if the environment 301 is a house).

Additionally or alternatively, the information may be obtained through the Internet of Things technology. For example, the running status of home appliances may be monitored through the Internet of Things technology. If the TV is in an active mode and all other devices are in a standby mode, the environment and activity gatherer 419 may infer that the user is watching TV.

Additionally or alternatively, the information may be obtained based on the user's utterances. For example, if a keyword "Hey Xgame" is used to activate an Intelligent Personal Assistant system related to video game services, and the user utters the keyword, the environment and activity gatherer 419 may infer that the user is playing video games. Additionally or alternatively, if the user utters "watch," the environment and activity gatherer 419 may infer that the user is watching TV.

Based on the information obtained, the delay/pause duration adjuster 421 may determine a delay duration that the delay buffer 403 may apply. The personal activity of the user may affect the delay duration. If the personal activity asks for prompt voice processing and response, the delay duration may be adjusted to be shorter. For example, if the user is playing a first-person shooter video game and the user utters "shoot the grenade to the non-player character!" the delay duration may be adjusted to be very short, so that the user's utterance may be received and processed by the application system 423 promptly. Additionally or alternatively, if the user is calling over the phone in full-duplex communication, delay might not be preferred, and the delay/pause duration adjuster 421 may fix the delay duration to be zero.

If the personal activity does not ask for prompt voice processing and response, the delay duration may be adjusted to be longer. For example, if the user is working and utters "email the report to the client," if the user is watching TV and utters "watch NBC," or if the user is cooking and utters "search a recipe for a steak," the delay duration may be adjusted to be longer.

Based on the information obtained, the delay/pause duration adjuster 421 may determine one or more pause durations that the source tracker controller 411 may apply. The personal activity of the user may affect the pause durations. For example, the environment 301 may be a user's house, and only the user may be in the house. If the user's current personal activity is something that may limit the user in one small area (e.g., watching TV (couch area), playing video games (video game console area), working (desk area), cooking (kitchen area)), the pause durations may accordingly be adjusted to be longer, because the user may be less likely to move. On the other hand, if the user's current personal activity is something that inherently composes of walking around (e.g., just entering the house), the pause durations may be adjusted to be shorter, because the user may be more likely to move.

Additionally or alternatively, there may be more than one user in the environment 301. The pause durations may be shorter if there are more users in the environment 301. For example, the pause durations may be shorter if there are two users in the environment 301 than if there is only one user in the environment 301, because if the beamformer 407 is focusing in the direction of one of the two users, the other user may be entitled to speak and deserve the focus of the beamformer 407.

Additionally or alternatively, the relationship between the users in the environment 301 may affect the pause durations. For example, if a parent and a child are in a house, the beamformer 407 may focus in the parent's direction for a longer pause duration than in the child's direction. If the users in the environment 301 possess unequal power (e.g., a parent and a child), the beamformer 407 may focus for a longer pause duration in the direction of the user with more power. If the users in the environment 301 possess equal power (e.g., a husband and a wife, or a coworker and a colleague, etc.), a same pause duration may be used for each of the users. The source tracker controller 411 may determine the identity of the speaker (e.g., whether the speaker is the parent or the child) based on the acoustic characteristics of the utterances of the users. The source tracker controller 411 may use a customized pause duration based on the identity of the speaker.

Additionally or alternatively, the delay/pause duration adjuster 421 may adjust the pause durations based on the location of the user within the environment 301 (e.g., couch area, video game console area, desk area, kitchen area, etc.). The location of the user may indicate the personal activity that the user is performing and hence the user's likelihood of movement. For example, the delay/pause duration adjuster 421 may adjust the pause duration to be longer if the user is determined to be sitting at his or her desk or on the couch. The delay/pause duration adjuster 421 may adjust the pause duration to be shorter if the user is determined to be standing near the door of the room.

Additionally or alternatively, the delay/pause duration adjuster 421 may adjust the pause durations based on the direction of the audio source, for example, at the time that the source tracking is paused. The delay/pause duration adjuster 421 may associate each direction of the microphone array 401 with an area of a room, and/or with corresponding pause durations. For example, the microphone array 401 may be placed in the middle of a room. The left side of the room (and of microphone array 401) is the entertaining region (including a couch and a TV), and the right side of the room (and of the microphone array 401) is entrance region (including the door of the room). The delay/pause adjuster 421 may associate the directions from the left side of the room with longer pause durations, and associate the directions from the right side of the room with shorter pause durations. If the direction of the audio source is from the left side of the room at the time that the source tracking is paused, the delay/pause duration adjuster 421 may assume that the user is speaking in the entertaining region, and may adjust the pause durations to be longer. If the direction of the audio source is from the right side of the room at the time that the source tracking is paused, the delay/pause duration adjuster 421 may assume that the user is speaking in the entrance region, and may adjust the pause durations to be shorter.

Additionally or alternatively, the delay/pause duration adjuster 421 may determine or adjust the pause durations based on the keyword or command phrase that the user utters, as the keyword or command phrase that the user utters may indicate the personal activity that the user is performing.

For example, a keyword "Hey XTV" may be used to activate an Intelligent Personal Assistant system related to TV services, a keyword "Hey Xgame" may be used to activate an Intelligent Personal Assistant system related to video game services, a keyword "Hey Xwork" may be used to activate an Intelligent Personal Assistant system related to work, a keyword "Hey Xcooking" may be used to activate an Intelligent Personal Assistant system related to cooking, a keyword "Hey Xhouse" may be used to activate an Intelligent Personal Assistant system related to house management (e.g., turning on and off the lights). Other keywords may be used, and Intelligent Personal Assistant systems related to other services may be activated. A specific keyword that the user utters may indicate the personal activity that the user is performing, and the delay/pause duration adjuster 421 may use that information to adjust the pause durations.

Additionally or alternatively, a keyword "Hey XHelper" may be used to activate an Intelligent Personal Assistant system, and the command phrase following the keyword "Hey XHelper" may be "watch NBC," "shoot a grenade," "search a recipe for a steak," "email the report to the client," or "lock the door and turn on the light in the living room." As the user speaks the command phrase, the delay/pause duration adjuster 421 may adjust the pause durations based on the portions of the command phrase that the user has already uttered. For example, after the user utters "Hey XHelper, watch," the delay/pause duration adjuster 421 may determine that the user may be watching TV. The delay/pause duration adjuster 421 may adjust the pause durations accordingly.

Figure 5A:
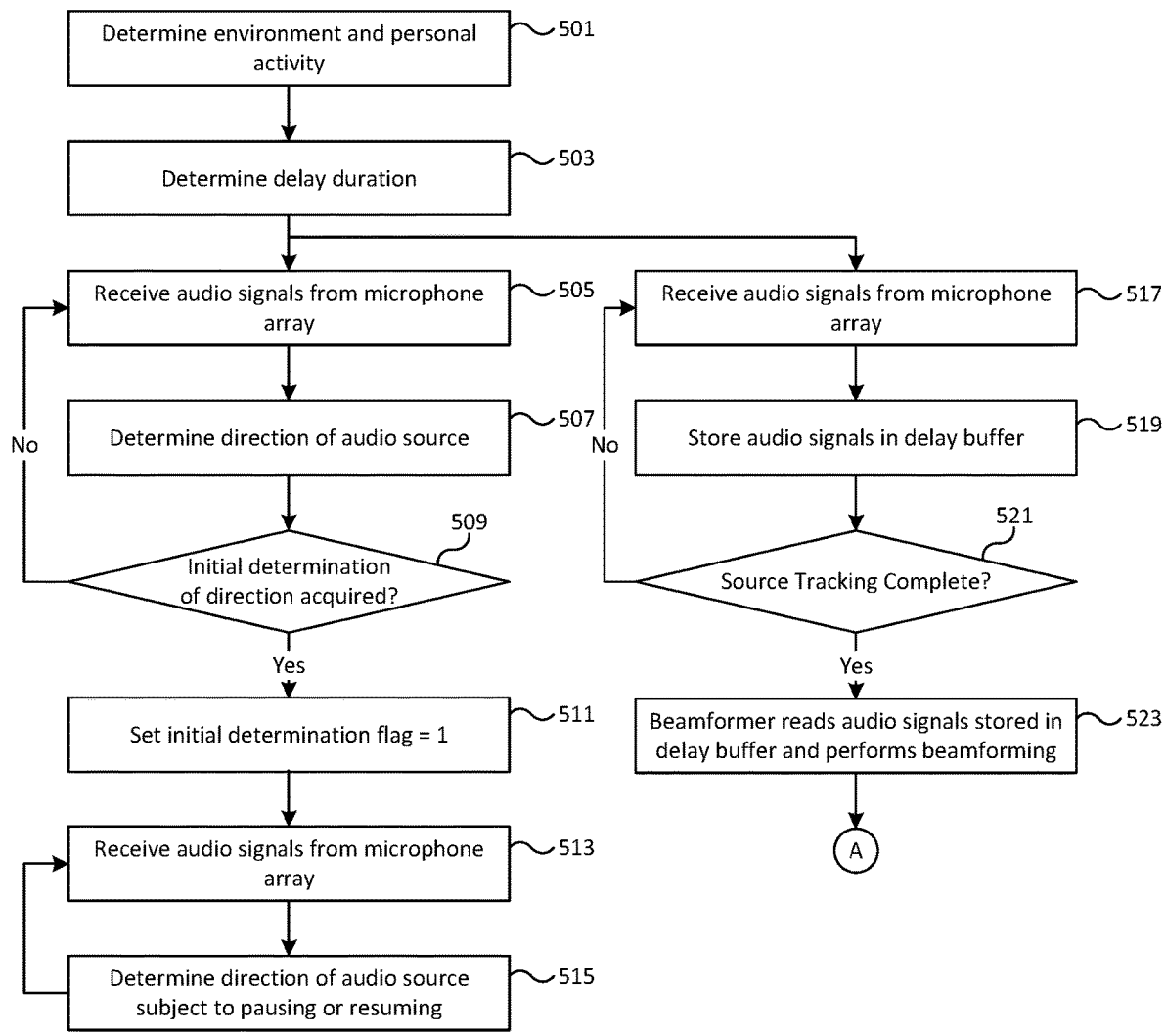
FIGS. 5A-C are a flowchart showing an example method for delaying beamforming and controlling source tracking.
Figure 5B:
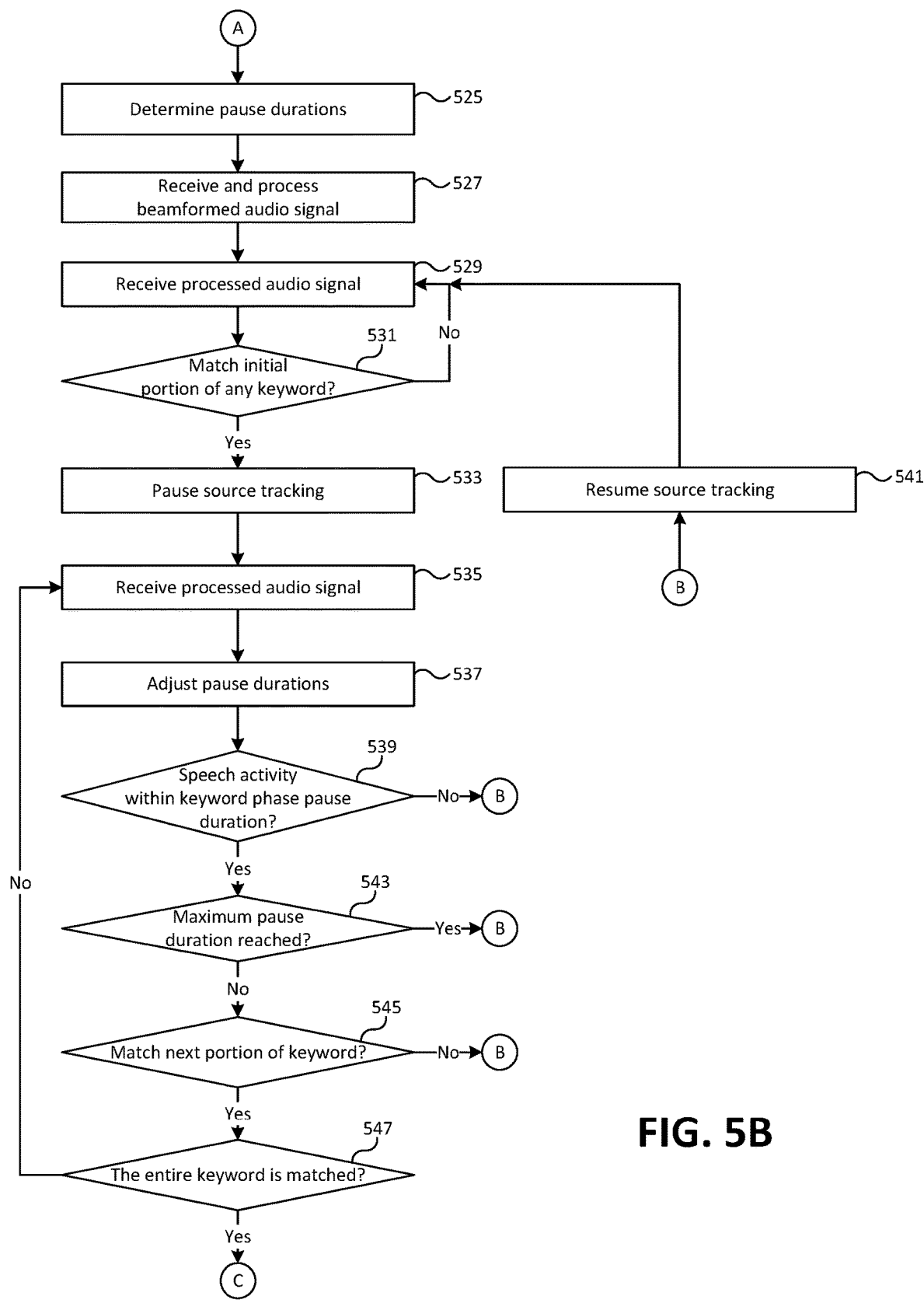
Figure 5C:
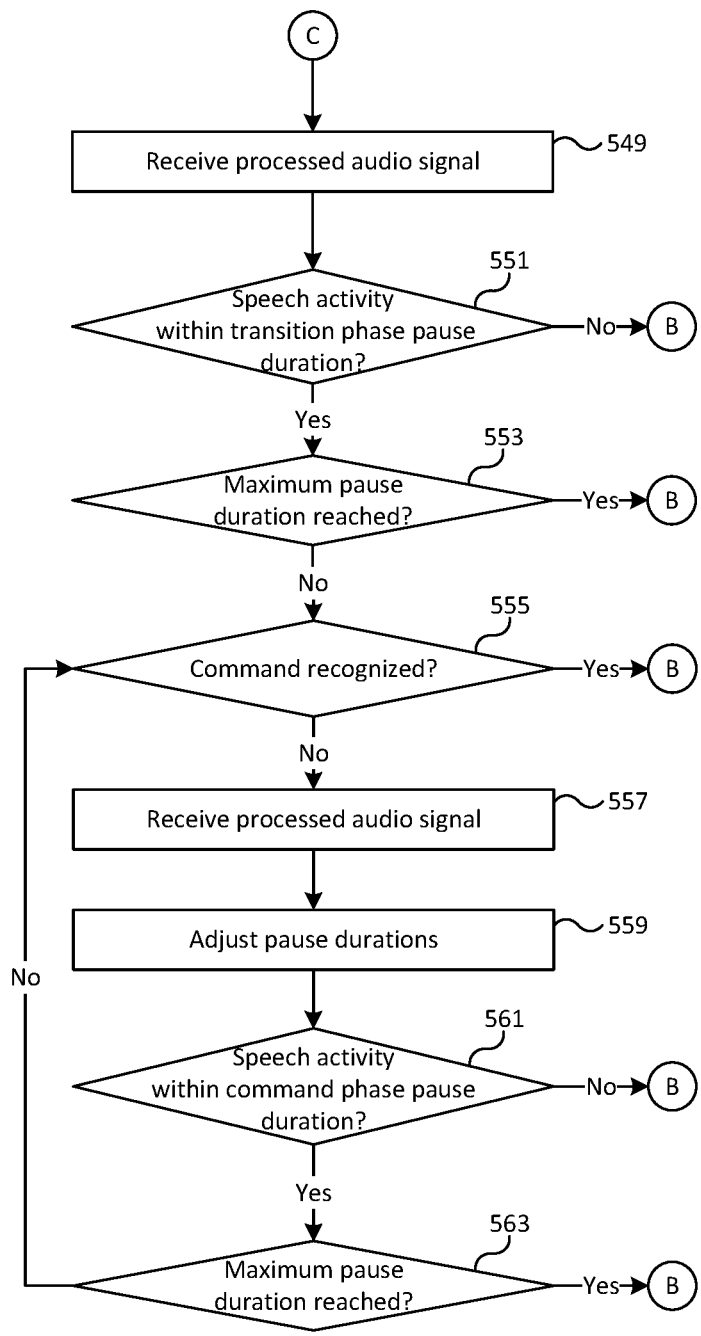

FIGS. 5A-C are a flowchart showing an example method for delaying beamforming and controlling source tracking. The method may be performed by the example system described in connection with FIG. 4. The method may be implemented or repeatedly performed to process each user utterance. Additionally or alternatively, the method may be initiated every time there is an onset of a sound. The method may start with step 501, where the environment and activity gatherer 419 may determine what the environment 301 is and the user's personal activity. The environment 301 may include a house, an office, a public forum, or other types of places. The user's personal activity may include watching TV, playing video games, cooking, working, making phone calls, just entering the house, or other types of personal activities. The determined environment 301 and personal activities may be used to determine a delay duration in step 503 or one or more pause durations in step 525.

The method may then proceed to step 503, where the delay/pause duration adjuster 421 may determine, based on the environment 301 and the user's personal activity, a delay duration the delay buffer 403 may apply. The delay duration may be adjusted as a function of operation mode. For example, if the operation mode is voice command processing mode, the delay duration may be set to be the maximum amount of time that the source tracker 405 takes to acquire an initial determination of the direction of the audio source. If the operation mode is phone call mode, the delay duration may be set to zero. Additionally or alternatively, the delay duration may vary depending on the degree of promptness for processing the user's utterance that the personal activity may require. The table below shows one example:

| Personal activity | Watching TV | Playing video games | Working | Cooking | Making phone calls |
|---|---|---|---|---|---|
| Delay duration | 0.5 seconds | 0.1 seconds | 0.4 seconds | 0.4 seconds | 0 second |

Additionally or alternatively, the delay durations used for different personal activities may be a percentage of the maximum amount of time that the source tracker 405 takes to acquire an initial determination of the direction of the audio source. The table below shows one example:

| Personal activity | Watching TV | Playing video games | Working | Cooking | Making phone calls |
|---|---|---|---|---|---|
| Delay duration | 100% * maximum tracking acquisition period | 20% * maximum tracking acquisition period | 80% * maximum tracking acquisition period | 80% * maximum tracking acquisition period | 0% * maximum tracking acquisition period |

After step 503, the method may proceed to steps 505, 517. Step 505 may start the processes associated with the source tracker 405. Step 517 may start the processes associated with the beamformer 407. In step 505, the source tracker 405 may receive audio signals from the microphone array 401. In step 507, the source tracker 405 may calculate a direction of an audio source based on the audio signals from the microphone array 401.

In step 509, the source tracker 405 may determine whether the source tracker 405 has acquired the initial determination of the direction of the audio source. After an onset of a sound, the source tracker 405 may take some time (e.g., 50-500 milliseconds) to make the initial determination of the direction of the audio source. The source tracker 405 may have a confidence level regarding the accuracy of the determination of the direction of the audio source, and may determine that it has acquired the initial determination of the direction of the audio source if the confidence level exceeds a threshold. The confidence level may be calculated based on the extent of variation in the successive source tracking results. Additionally or alternatively, the confidence level may be calculated based on beamforming the audio signals with the source tracking results. If the signal to noise ratio of a beamformed audio signal produced by beamforming the audio signals with the source tracking results is high, the confidence level is correspondingly high.

If the source tracker 405 determines that it has not obtained the initial determination of the direction of the audio source, the source tracker 405 may go back to steps 505, 507, where the source tracker 405 may continue to calculate the direction of the audio source based on additional portions of the audio signals from the microphone array 401. Otherwise, the method may proceed to step 511, where the source tracker 405 may set the initial determination flag to be "1" (one), indicating that the initial determination of the direction of the audio source has been acquired.

In steps 513, 515, the source tracker 405 may continuously receive additional portions of the audio signals from the microphone array 401, and continuously calculate and update the direction of the audio source. The continuous calculating and updating the direction of the audio source by source tracker 405 may be controlled (e.g., paused or resumed) by the source tracker controller 411 in steps 533, 541, as discussed below. Additionally or alternatively, during performing steps 513, 515, the source tracker 405 may continuously monitor or periodically determine whether the source tracking confidence level falls below a threshold. If the answer yes, the source tracker 405 may reset the initial determination flag to "0" (zero). Otherwise, the initial determination flag may be set to "1" (one). The beamformer 407 may be configured to continuously monitor or periodically determine whether the initial determination flag is reset to "0" (zero). If the answer is yes, the beamformer 407 may be configured to pause reading and processing (e.g., beamforming) the audio signals stored in the delay buffer 403, until the initial determination flat is set to "1" (one).

After step 503, the method may in a parallel path proceed to step 517, where the delay buffer 403 may in parallel with the source tracker 405 receive the audio signals from the microphone array 401. This parallel path may be a beamforming process executed by a parallel thread on a multi-thread processor, or a separate processor, from the source tracking process described above. Additionally or alternatively, the steps of the example method (including the beamforming process, the source tracking process, or other processes) may be performed in a single thread. For example, each step may operate on 20 millisecond blocks of Pulse-Code Modulation data, and each step may be sequentially performed in a single thread. In step 519, the delay buffer 403 may store the audio signals. For example, the delay buffer 403 may store the audio signals in a first in first out buffer.

In step 521, the beamformer 407 may determine whether to start beamforming on the audio signals stored in the delay buffer 403. This determination may be made based on various criteria. For example, the determination may be made based on whether a fixed delay that equals to a maximum amount of time that the source tracker 405 takes to acquire an initial determination of the direction of the audio source has been reached. The source tracker 405 may take 50-500 milliseconds to acquire an initial determination of the direction of the audio source. The fixed delay may equal to 500 milliseconds. If the delay buffer 403 has stored 500 milliseconds' audio signals, the beamformer 407 may determine to start beamforming on the stored audio signals. Otherwise, the beamformer 407 may determine not to start beamforming on the stored audio signals.

Additionally or alternatively, the determination may be made based on the delay duration determined in step 503. For example, the user may be playing a video game, and the delay/pause duration adjuster 421 may in step 503 set the delay duration to be 0.1 seconds. The beamformer 407 may determine whether the delay duration has been reached (i.e., whether the audio signals stored in the delay buffer 403 has reached a size that is more than 0.1 seconds). If the delay duration has been reached, the beamformer 407 may determine to start beamforming on the stored audio signals. Otherwise, the beamformer 407 may determine not to start beamforming on the stored audio signals. Additionally or alternatively, the user may be making a phone call, and the delay duration determined in step 503 may be zero. The beamformer 407 may determine to start beamforming on the stored audio signals.

Additionally or alternatively, the determination in step 521 may be made based on whether in a specific instance the source tracker 405 has acquired the initial determination of the direction of the audio source. For example, the delay buffer 403 may determine whether the initial determination flag has been set as "1" (one), which indicates that the source tracker 405 at that moment has acquired the initial determination. If the flag has been set as "1" (one), the beamformer 407 may determine to start beamforming on the stored audio signals. Otherwise, the beamformer 407 may determine not to start beamforming on the stored audio signals.

In step 521, if the beamformer 407 determines to start beamforming on the stored audio signals, the method may proceed to step 523. Otherwise, the method may go back to steps 517, 519, where the delay buffer 403 may receive and store additional portions of the audio signals from the microphone array 401.

In step 523, the beamformer 407 may start reading the audio signals stored in the delay buffer 403, and start beamforming on the audio signals. The beamformer 407 may read the audio signals stored in the delay buffer 403 at fixed intervals, and process (e.g., beamform) the read audio signals. The fixed intervals may be the audio signals' sampling period (corresponding to the audio signals' sampling frequency). The beamformed audio signal may lag the audio signals from the microphone array 401 by a constant delay.

Additionally or alternatively, the beamformer 407 may read the audio signals stored in the delay buffer 403 as fast as the computing capacity of the beamformer 407 may allow. The delay between the beamformed audio signal and the audio signals from the microphone array 401 may be reduced gradually (assuming the computing capacity of the beamformer 407 allows it to read the delay buffer 403 at an interval smaller than the audio signals' sampling period). For example, if there are data corresponding to the audio signals remaining in the delay buffer 403 (e.g., a first in first out buffer), the beamformer 407 may read the data and apply the signal processing algorithm (beamforming) to the read data. The beamformer 407 may read and process the data stored in the delay buffer 403 until the delay buffer 403 is empty. The beamformed audio signal may be input into an Automatic Speech Recognition system to get the transcription of the beamformed audio signal, or used for other purposes.

Additionally or alternatively, the delay buffer 403 may drop one or more bits of data stored in the delay buffer 403 that indicate silence, or the beamformer 407 may ignore the one or more bits of data that indicate silence when the beamformer 407 reads the data. This may allow reduction of the delay during periods of relative silence. To increase the delay, comfort noise may be inserted into the delay buffer 403.

After step 523, the method may proceed to step 525, where the delay/pause duration adjuster 421 may determine one or more pause durations. The pause durations may include a keyword phase pause duration, a transition phase pause duration, a command phase pause duration, a maximum pause duration, and/or other types of pause durations. The keyword phase pause duration may be a time period within which the user is expected to continue speaking (e.g., to complete a keyword) after the user's last speech activity associated with the keyword. The transition phase pause duration may be a time period within which the user is expected to start speaking the command phrase after the user has completed speaking the keyword. The command phase pause duration may be a time period within which the user is expected to continue speaking (e.g., to complete the command phrase) after the user's last speech activity associated with the command phrase. The maximum pause duration may be a time period that starts to count when the source tracking is paused, and after which the source tracking is resumed (i.e., a time period within which the user is expected to finish speaking the command phrase corresponding to a recognized voice command after pausing the source tracking). The pause durations may vary depending on the environment 301 and the user's personal activity. If the user is more likely to move when conducting the personal activity, the pause durations may be adjusted to be shorter. The table below shows one example:

| Personal activity (activity area) | Watching TV (couch) | Playing video games (in front of video game console) | Working (desk) | Cooking (kitchen) | Just entering house (walk around) |
|---|---|---|---|---|---|
| Keyword phase pause duration | 0.5 seconds | 0.4 seconds | 0.5 seconds | 0.4 seconds | 0.2 seconds |
| Transition phase pause duration | 10 seconds | 8 seconds | 10 seconds | 8 seconds | 4 seconds |
| Command phase pause duration | 4 seconds | 3.2 seconds | 4 seconds | 3.2 seconds | 1.6 seconds |
| Maximum pause duration | 15 seconds | 12 seconds | 15 seconds | 12 seconds | 6 seconds |

After step 525, the method may proceed to step 527, where the audio processing subsystem 409 may continuously receive and process the beamformed audio signal from the beamformer 407, and continuously generate a processed audio signal, as discussed in connection with FIG. 4. After step 527, the method may proceed to step 529, where the source tracker controller 411 may receive the processed audio signal from the audio processing subsystem 409.

Additionally or alternatively, the source tracker controller 411 (and/or the audio processing subsystem 409) may receive the audio signals from the microphone array 401. The source tracker controller 411 may control (pause or resume) the source tracker 405 based on analyzing the audio signals from the microphone array 401. For example, the source tracker controller 411 may perform one or more steps of the method based on the audio signals from the microphone array 401. The source tracker controller 411 may be put in a single microphone mode. For example, the source tracker controller 411 may detect keywords, detect voice commands, or detect speech activity based on analyzing one audio signal from one microphone of the microphone array 401 during a period when the source tracker 405 is making the initial determination of the direction, or when the beamformer 407 has not started beamforming the audio signals from the microphone array 401. This may allow the source tracker controller 411 to always have the benefit of being able to receive some input from the microphone array 401.

The method may then proceed to step 531, where the source tracker controller 411 may determine whether the processed audio signal indicates an initial portion of a keyword. The keyword may be a wake-up word that may trigger or enable a natural language command recognition functionality of a natural language controlled device (e.g., an Intelligent Personal Assistant system). For example, the initial portion of the keyword may be "H," "He," "Hey," "Hey X," "Hey XH," "Hey XHe," "Hey XHel," "Hey XHelp," or "Hey XHelpe," if the keyword is "Hey XHelper." If the answer is yes, the method may proceed to step 533, where the source tracker controller 411 may pause the source tracking of the source tracker 405. For example, the source tracker controller 411 may send to the source tracker 405 a command to stop calculating and updating the direction of the audio source based on incoming portions of the audio signals from the microphone array 401. Additionally or alternatively, the source tracker 405 may continue to calculate the direction of the audio source, and the source tracker controller 411 may ask the beamformer 407 to temporarily ignore the latest source tracking results from the source tracker 405. If the answer is no, the method may go back to step 529, where the source tracker controller 411 may continue to receive additional portions of the processed audio signal.

For example, the keyword may be "Hey XHelper," which may activate the application system 423 (e.g., an Intelligent Personal Assistant system) into an active mode from a standby mode (e.g., after detecting "Hey XHelper" being spoken, the Intelligent Personal Assistant system may activate its voice control program, and start to listen to the user's voice to recognize voice commands). An initial portion of the keyword may be "Hey X." If the source tracker controller 411 determines that the processed audio signal indicates "Hey X," the source tracker controller 411 may pause the source tracking of the source tracker 405. If the source tracker controller 411 determines that the processed audio signal does not indicate "Hey X," the source tracker controller 411 may continue to listen to a next portion of the processed audio signal and determine if the next portion of the processed audio signal indicates "Hey X."

Additionally or alternatively, in step 531, the source tracker controller 411 may otherwise determine, based on the processed audio signal, whether the user indicates to speak to the application system 423 (e.g., to issue voice commands to an Intelligent Personal Assistant system). If the answer is yes, the source tracker controller 411 may pause the source tracking. If the answer is no, the source tracker controller 411 may continue to receive additional portions of the processed audio signal.

The determination whether the user indicates to speak to the application system 423 may be made in various ways. For example, the application system 423 (e.g., an Intelligent Personal Assistant system) may remain in a standby mode until it is activated by a keyword (e.g., a wake-up word). The user may indicate to speak to the application system 423 by uttering the entire keyword. The source tracker controller 411 may recognize the user's indication to speak to the application system 423 if the source tracker controller 411 detects the entire keyword in the user's utterance.

Additionally or alternatively, the application system 423 (e.g., an Intelligent Personal Assistant system) may be always in an active mode (i.e., it does not need to be activated by a keyword). The user may indicate to speak to the application system 423 by making some speech. The source tracker controller 411 may receive the user's indication to speak to the application system 423 if the source tracker controller 411 determines that there is some speech activity. Additionally or alternatively, each voice command may have a beginning keyword, and if the source tracker controller 411 detects the beginning keyword, the source tracker controller 411 may recognize the user's indication to speak to the application system 423. For example, the word "change" may be a beginning keyword for a voice command to change TV channels (e.g., by a command phrase "change to channel five"), and if the source tracker controller 411 detects the word "change," the source tracker controller 411 may recognize the user's indication to speak to the application system 423. The word "shoot" may be a beginning keyword for a voice command to fire firearms in shooter video games (e.g., by a command phrase "shoot the grenade launcher"), and if the source tracker controller 411 detects the word "shoot," the source tracker controller 411 may recognize the user's indication to speak to the application system 423.

After the source tracker controller 411 pauses the source tracking in step 533, the source tracker controller 411 may determine whether the user indicates to cease speaking to the application system 423. If the answer is yes, the source tracker controller 411 may resume the source tracking. Otherwise, the source tracker controller 411 may continue pausing the source tracking. The source tracker controller 411 may determine whether the user indicates to cease speaking to the application system 423 in various ways as discussed below.

In step 535, the source tracker controller 411 may continue to receive additional portions of the processed audio signal. In step 537, the delay/pause duration adjuster 421 may adjust the pause durations based on the portions of the processed audio signal that have been received (e.g., the portions of the processed audio signal that indicate an initial portion of a keyword, a keyword, or an initial portion of a command phrase). Different keywords may be used to activate Intelligent Personal Assistant systems related to different services. For example, keywords "Hey XTV," "Hey Xgame," "Hey Xwork," "Hey Xcooking," and "Hey Xhouse" may be used to activate Intelligent Personal Assistant systems related to TV services, video game services, work services, cooking services, and house management services respectively. The pause durations may vary depending on the different keywords, as the keywords may indicate the user's personal activities. The table below shows one example:

| Keyword | "Hey XTV" | "Hey Xgame" | "Hey Xwork" | "Hey Xcooking" | "Hey Xhouse" |
|---|---|---|---|---|---|
| Keyword phase pause duration | 0.5 seconds | 0.4 seconds | 0.5 seconds | 0.4 seconds | 0.2 seconds |
| Transition phase pause duration | 10 seconds | 8 seconds | 10 seconds | 8 seconds | 4 seconds |
| Command phase pause duration | 4 seconds | 3.2 seconds | 4 seconds | 3.2 seconds | 1.6 seconds |
| Maximum pause duration | 15 seconds | 12 seconds | 15 seconds | 12 seconds | 6 seconds |

For example, after the user utters "Hey Xg," the delay/pause duration adjuster 421 may adjust the pause durations to be the values corresponding to "Hey Xgame." Additionally or alternatively, the delay/pause duration adjuster 421 may adjust the pause durations after the user utters the entire keyword. For example, after the user utters "Hey Xgame," the delay/pause duration adjuster 421 may adjust the pause durations to be the values corresponding to "Hey Xgame."

In step 539, the source tracker controller 411 may determine whether the additional portions of the processed audio signal indicate speech activity within a keyword phase pause duration after the last speech activity associated with the keyword. If the source tracker controller 411 determines that there is no speech activity within the keyword phase pause duration after the last speech activity associated with the keyword, the method may proceed to step 541, where the source tracker controller 411 may resume the source tracking. For example, the source tracker controller 411 may send to the source tracker 405 a command to restart calculating and updating the direction of the audio source based on incoming portions of the audio signals from the microphone array 401. Additionally or alternatively, the source tracker controller 411 may ask the beamformer 407 to stop ignoring the latest source tracking results from the source tracker 405. After step 541, the method may go back to step 529.

For example, after the user utters "Hey X," the user might not utter anything else. The source tracker controller 411 may wait for the user to continue to speak for the keyword phase pause duration. If the user does not utter anything within the keyword phase pause duration, the source tracker controller 411 may assume that the user indicates to cease speaking to the application system 423, and the source tracker controller 411 may resume the source tracking.

In step 539, if source tracker controller 411 determines that there is speech activity within the keyword phase pause duration after the last speech activity associated with the keyword, the method may proceed to step 543, where the source tracker controller 411 may determine whether the maximum pause duration has been reached since pausing the source tracking of the source tracker 405. If the answer is yes, the method may proceed to step 541, where the source tracker controller 411 may resume the source tracking of the source tracker 405. If the answer is no, the method may proceed to step 545.

In step 545, the source tracker controller 411 may determine whether the additional portions of the processed audio signal indicate a next portion of the keyword. If the source tracker controller 411 determines that the additional portions of the processed audio signal do not indicate the next portion of the keyword, the source tracker controller 411 may resume the source tracking. Otherwise, the method may proceed to step 547, where the source tracker controller 411 may determine whether the entire keyword is found in the processed audio signal.

If the source tracker controller 411 determines that the processed audio signal indicates the entire keyword, the method may proceed to step 549. Otherwise, the method may go back to step 535, where the source tracker controller 411 may continue to receive additional portions of the processed audio signal.

For example, after the user utters "Hey X," the user may continue to speak (e.g., uttering "avier," "he," or other syllables). The source tracker controller 411 may detect the speech activity, and continue to determine whether the user's utterance indicates the next portion of the keyword. For example, after the user utters "Hey X," the user may continue to say "avier," which does not match "helper," the next portion of the keyword after "Hey X." The source tracker controller 411 may determine that the user does not indicate to speak to the application system 423, but rather is addressing "Xavier." The source tracker controller 411 may then resume the source tracking.

Additionally or alternatively, after the user utters "Hey X," the user may say "he," which matches a next portion of the keyword after "Hey X." The source tracker controller 411 may then determine whether the user has uttered the entire keyword. For example, the user may utter "Hey X" and "he," but not "lper," and hence the user may fail to utter the entire keyword "Hey XHelper." The source tracker controller 411 may continue to listen to additional portions of the processed audio signal, going back to step 535. Additionally or alternatively, after the user utters "Hey X" and "he," the user may continue to utter "lper." The source tracker controller 411 may determine that the user has uttered the entire keyword, and the method may proceed to step 549.

In step 549, the source tracker controller 411 may continue to receive additional portions of the processed audio signal. In step 551, the source tracker controller 411 may determine if there is speech activity within a transition phase pause duration after the user has uttered the entire keyword. If there is no speech activity within the transition phase pause duration after the user has uttered the entire keyword, the method may proceed to step 541, where the source tracker controller 411 may resume the source tracking. Otherwise, the method may proceed to step 553.

For example, after the user utters "Hey XHelper," the user might not continue to say anything else with the transition phase pause duration. The source tracker controller 411 may determine that the user does not want to continue to issue a voice command, and the source tracker controller 411 may resume the source tracking. Additionally or alternatively, after the user utters "Hey XHelper," the user may say "watch" within the transition phase pause duration. The source tracker controller 411 may determine that there is speech activity within the transition phase pause duration, and assume that the user wants to continue to issue a voice command.

In step 553, the source tracker controller 411 may determine whether the maximum pause duration has been reached since pausing the source tracking of the source tracker 405. If the answer is yes, the method may proceed to step 541, where the source tracker controller 411 may resume the source tracking of the source tracker 405. If the answer is no, the method may proceed to step 555.

In step 555, the source tracker controller 411 may determine whether the user's utterance that has been received indicates a voice command that can be recognized. If the answer is yes, the source tracker controller 411 may resume the source tracking. If the answer is no, the method may proceed to step 557. For example, the user's utterance that has been received may be "watch NBC," and the source tracker controller 411 can recognize that command phrase to be a voice command that can be executed (a voice command to turn on the TV and turn the channel to NBC). The user has issued a voice command, and the source tracker controller 411 may assume that the user has finished speaking with the application system 423, and source tracker controller 411 may resume the source tracking. Additionally or alternatively, the user's utterance that has been received may be "watch," and the source tracker controller 411 does not recognize that as a voice command, and the source tracker controller 411 may proceed to step 557.

In step 557, the source tracker controller 411 may continue to receive additional portions of the processed audio signal. In step 559, the delay/pause duration adjuster 421 may adjust the pause durations (e.g., the command phase pause duration and the maximum pause duration) based on the command phrase that the user has uttered. Different command phrases may indicate the user is performing different personal activities. The pause durations may vary depending on the user's likelihoods of movement associated with the personal activities. The table below shows one example:

| Command phrase | "Hey XHelper, watch NBC" | "Hey XHelper, shoot a grenade" | "Hey XHelper, email report to client" | "Hey XHelper, search recipe for steak" | "Hey XHelper, lock the door and turn on the light in the living room" |
| --- | --- | --- | --- | --- | --- |
| Command phase pause duration | 4 seconds | 3.2 seconds | 4 seconds | 3.2 seconds | 1.6 seconds |
| Maximum pause duration | 15 seconds | 12 seconds | 15 seconds | 12 seconds | 6 seconds |

The delay/pause duration adjuster 421 may adjust the pause durations based on the initial portion of the command phrase. For example, after the user utters "Hey XHelper, shoot," the delay/pause duration adjuster 421 may determine that the word "shoot" is a word used in the context of playing video games. The delay/pause duration adjuster 421 may adjust the pause durations to be the values associated with playing video games. Additionally or alternatively, after the user utters "Hey XHelper, shoot," the delay/pause duration adjuster 421 may determine that the word "shoot" is likely to be followed with "a grenade," and may adjust the pause durations to be the values associated with the command phrase "Hey XHelper, shoot a grenade."

After step 559, the method may proceed to step 561, where the source tracker controller 411 may determine whether there is speech activity within a command phase pause duration after the last speech activity associated with the command phrase. If there is no speech activity within the command phase pause duration after the last speech activity associated with the command phrase, the user may indicate that the user does not want to complete the command phrase, and the source tracker controller 411 may resume the source tracking. If the source tracker controller 411 determines that there is speech activity within the command phase pause duration after the last speech activity associated with the command phrase, the source tracker controller 411 may go to perform step 563.

In step 563, the source tracker controller 411 may determine whether the maximum pause duration has been reached since pausing the source tracking of the source tracker 405. If the answer is yes, the method may proceed to step 541, where the source tracker controller 411 may resume the source tracking of the source tracker 405. If the answer is no, the method may go back to step 555, where it may determine whether a voice command is recognized.

For example, after the user utters "watch," the user might not utter anything else within the command phase pause duration, the source tracker controller 411 may resume the source tracking. Additionally or alternatively, after the user utters "watch," the user may continue to utter something (e.g., "NBC" or "the") within the command phase pause duration. The source tracker controller 411 may determine that there is speech activity, and continue to determine whether a voice command is recognized. For example, after the user utters "watch," the user may utter "NBC." The source tracker controller 411 may determine that the user has spoken a command phrase "watch NBC" corresponding to a recognized voice command. Additionally or alternatively, after the user utters "watch," the user may utter "the," but not anything else. The source tracker controller 411 may determine that the user has not issued a recognized voice command.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
    beamforming, by a computing device, audio from an audio source;
    recognizing, based on the beamformed audio and via a voice recognition process, an initial portion of a command phrase;
    pausing, based on the recognizing of the initial portion of the command phrase, and before completion of the command phrase, an audio source tracking process for a pause duration based on a location of a speaker of the initial portion of the command phrase; and
    resuming, after determining, via the voice recognition process, that the command phrase has completed, and before an end of the pause duration, the audio source tracking process.

2. The method of claim 1, wherein the beamforming the audio is based on a source direction indicated by the audio source tracking process.

3. The method of claim 1, wherein the pause duration is further based on identification of a keyword in the initial portion of the command phrase.

4. The method of claim 1, wherein the pause duration is further based on a likelihood that the speaker will move.

5. The method of claim 1, wherein the pause duration is further based on determining whether the speaker is sitting or standing.

6. The method of claim 1, wherein the pausing the audio source tracking process comprises pausing the audio source tracking process further based on determining that the audio comprises human speech.

7. The method of claim 1, further comprising:
    recognizing, based on the beamformed audio and via the voice recognition process, an initial portion of a second command phrase;
    pausing, based on the recognizing the initial portion of the second command phrase, the audio source tracking process for the pause duration; and
    resuming, after the pause duration and based on determining that no speech activity is detected following the initial portion of the command phrase, the audio source tracking process.

8. The method of claim 1, further comprising, after an end of a voice input following the initial portion of the command phrase, continuing pausing the audio source tracking process until the command phrase is recognized as a voice command.

9. An apparatus comprising:
    one or more processors; and
    memory storing instructions that, when executed by the one or more processors, cause the apparatus to:
        beamform audio from an audio source;
        recognize, based on the beamformed audio and via a voice recognition process, an initial portion of a command phrase;
        pause, based on the recognizing of the initial portion of the command phrase, and before completion of the command phrase, an audio source tracking process for a pause duration based on a location of a speaker of the initial portion of the command phrase; and
        resume, after determining, via the voice recognition process, that the command phrase has completed, and before an end of the pause duration, the audio source tracking process.

10. The apparatus of claim 9, wherein the instructions, when executed by the one or more processors, cause the apparatus to beamform the audio by causing beamforming the audio based on a source direction indicated by the audio source tracking process.

11. The apparatus of claim 9, wherein the pause duration is further based on identification of a keyword in the initial portion of the command phrase.

12. The apparatus of claim 9, wherein the pause duration is further based on a likelihood that the speaker will move.

13. The apparatus of claim 9, wherein the pause duration is further based on determining whether the speaker is sitting or standing.

14. The apparatus of claim 9, wherein the instructions, when executed by the one or more processors, cause the apparatus to pause the audio source tracking process by causing pausing the audio source tracking process further based on determining that the audio comprises human speech.

15. The apparatus of claim 9, wherein the instructions, when executed by the one or more processors, cause the apparatus to:
    recognize, based on the beamformed audio and via the voice recognition process, an initial portion of a second command phrase;
    pause, based on the recognizing the initial portion of the second command phrase, the audio source tracking process for the pause duration; and
    resume, after the pause duration and based on determining that no speech activity is detected following the initial portion of the command phrase, the audio source tracking process.

16. The apparatus of claim 9, wherein the instructions, when executed by the one or more processors, cause the apparatus to, after an end of a voice input following the initial portion of the command phrase, continue pausing the audio source tracking process until the command phrase is recognized as a voice command.

17. A non-transitory computer readable medium storing instructions that, when executed, cause:
- beamforming audio from an audio source;
- recognizing, based on the beamformed audio and via a voice recognition process, an initial portion of a command phrase;
- pausing, based on the recognizing of the initial portion of the command phrase, and before completion of the command phrase, an audio source tracking process for a pause duration based on a location of a speaker of the initial portion of the command phrase; and
- resuming, after determining, via the voice recognition process, that the command phrase has completed, and before an end of the pause duration, the audio source tracking process.

18. The non-transitory computer readable medium of claim 17, wherein the instructions, when executed, cause the beamforming the audio by causing beamforming the audio based on a source direction indicated by the audio source tracking process.

19. The non-transitory computer readable medium of claim 17, wherein the pause duration is further based on identification of a keyword in the initial portion of the command phrase.

20. The non-transitory computer readable medium of claim 17, wherein the pause duration is further based on likelihood that the speaker will move.

21. The non-transitory computer readable medium of claim 17, wherein the pause duration is further based on determining whether the speaker is sitting or standing.

22. The non-transitory computer readable medium of claim 17, wherein the instructions, when executed, cause the pausing the audio source tracking process by causing pausing the audio source tracking process further based on determining that the audio comprises human speech.

23. The non-transitory computer readable medium of claim 17, wherein the instructions, when executed, cause:
- recognizing, based on the beamformed audio and via the voice recognition process, an initial portion of a second command phrase;
- pausing, based on the recognizing the initial portion of the second command phrase, the audio source tracking process for the pause duration; and
- resuming, after the pause duration and based on determining that no speech activity is detected following the initial portion of the command phrase, the audio source tracking process.

24. The non-transitory computer readable medium of claim 17, wherein the instructions, when executed, cause, after an end of a voice input following the initial portion of the command phrase, continuing pausing the audio source tracking process until the command phrase is recognized as a voice command.

* * * * *